Feb. 8, 1944.   J. MERRELL   2,341,112
OUTLET BOX FITTING
Filed Aug. 25, 1942

INVENTOR
James Merrell,
BY
Bean, Brooks, Buckley & Bean.
ATTORNEYS

Patented Feb. 8, 1944

2,341,112

UNITED STATES PATENT OFFICE 2,341,112

OUTLET BOX FITTING

James Merrell, Buffalo, N. Y., assignor to Trico Products Corporation, Buffalo, N. Y.

Application August 25, 1942, Serial No. 456,025

7 Claims. (Cl. 285—6.5)

This invention relates to electric wiring and conduits and more particularly to the securement of flexible armor conduits to outlet or junction boxes. The walls of outlet boxes have a series of knock-out sections or slugs which may be displaced selectively to provide another opening through which additional circuit wiring may be brought into the box. Within each wall opening is usually secured an anchor fitting for supporting the flexible armor of the cable or wiring and thereby relieves the latter of unnecessary strain and wear. Heretofore, the member of armored cables which an outlet box can accommodate has been limited by the number of knock-out sections in the box and consequently when the box had reached its capacity other provision was resorted to for further wiring and this was not always feasible.

The present invention has for its object to provide means by which the capacity of the outlet box to accommodate additional wiring may be increased in a practical and efficient manner. More especially the invention contemplates a multi-cable anchor fitting which is simple in construction and design to facilitate the introduction of plural circuits to the outlet box.

In the drawing

Figure 1:
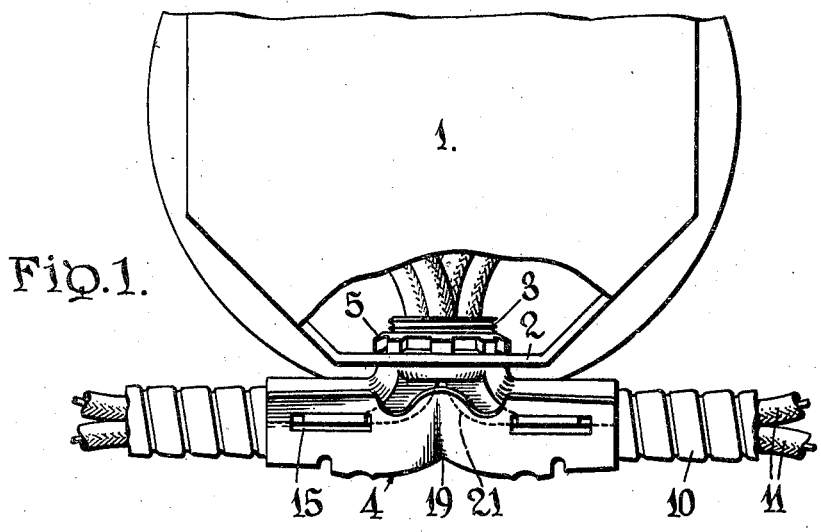
Fig. 1 is a fragmentary illustration of an outlet box in plan to which the present invention has been applied.
Figure 2:
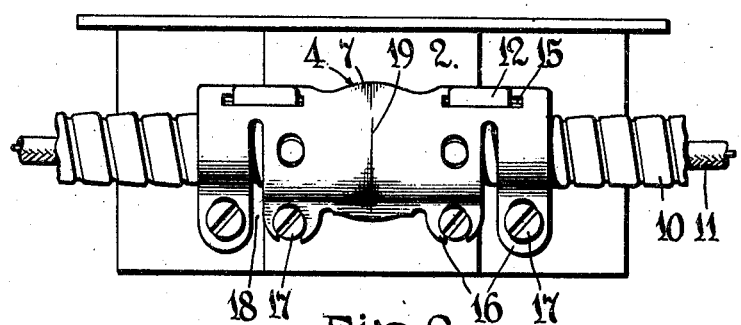
Fig. 2 is a side elevation of the same.
Figure 3:
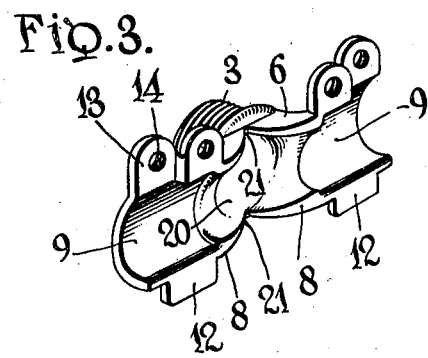
Fig. 3 is a perspective of the base of the fitting.

Referring more particularly to the drawing, the numeral 1 designates an outlet box having a side wall 2 with an opening or hole through which the threaded mounting stem 3 of the cable anchoring fitting, generally designated by the numeral 4, extends. A clamp nut 5 engaged with the threaded stem serves to secure the fitting in place.

The multi-cable fitting comprises a base part 6 and a cap part 7, the former carrying the threaded stem 3 and constituting a plurality of arms 8 extending radially therefrom. Each arm is formed with a channeled seat 9 to receive the flexible armor 10 of the cable or wiring 11, the channel seats herein being in alinement. The arms are also formed with hooks 12 projecting laterally from one edge while ears 13 extend laterally from the opposite edge and have threaded screw receiving apertures 14. The cap 7 is also preferably in one piece and formed with channeled seats opposing the seats 9. Along one edge the cap is provided with eyes 15 in which the hooks 12 engage and along the opposite edge with apertured ears 16 through which clamping screw 17 pass for engaging the threaded apertures 14. The outer ears 16 may be rendered resilient by the slot 18. Midway of its length the cap is formed with a transverse cable bending rib 19 which not only serves to bend or compress the wiring into compact conformity to the flare of the throat 20 of the base 6 but also to mechanically interlock with such wires as well as with the V-shaped notches 21 in the sides of the base. This action tends to center the cap on the base and also provides a sturdy anchor fitting with a firm armor clamping embrace.

Figure 4:
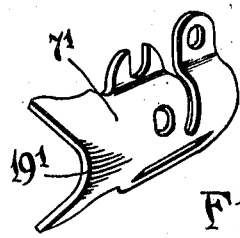
Fig. 4 is a like view of a modified cap.

The cap may be made in multiple parts by dividing the same transversely at the conforming and interlocking rib 19', as shown in Fig. 4, to form an individual cap section 7' for each arm, in which instance the hook and eyes of one arm and cap assembly may be disposed on the opposite side from the corresponding parts of the companion assembly.

The fitting is simple and practical in that it adapts each hole in the wall of the outlet box for the reception of plural armored cables, and while the foregoing description has been given in detail for clarity, it is not the intention thereby to restrict the invention, the principles of which are adaptable to other physical embodiments without departing from its spirit and scope, as defined in the appended claims.

What is claimed is:

1. A fitting for anchoring plural armored cables in an outlet box, comprising a base having plural armor receiving seats radiating from a throat in a mounting stem, cap means cooperating with the armor seats to anchor the cable armors therein, means for securing the cap means operative, and means on the cap means to deflect the cable terminals which project from the anchored armors down into the throat of the mounting stem.

2. A fitting for anchoring plural armored cables in an outlet box, comprising a substantially T-shaped base having plural armor receiving seats radiating from a throat in a mounting stem, the seats lying substantially in a common plane which extends transversely of the axis of the stem, the base between the seats having centering means, and cap means extending transversely of the stem and cooperating with the seats to anchor cable armors therein, said cap means having a part interlocking with the centering means to position the cap means on the base and serving to hold the cap means against radial displacement.

3. A fitting for anchoring plural armored cables in an outlet box, comprising a base having plural armor receiving seats leading to a throat in a mounting stem, the seats lying in a common plane which extends transversely of the stem, and such seats opening away from the plane and the stem, a cap having plural seats removably placed upon the base seats for anchoring plural cable armors, and means on the cap intermediate its seats for interlocking with the base to deflect the cables into the throat.

4. A fitting for anchoring plural armored cables in an outlet box, comprising a base having plural armor receiving seats leading to a throat in an angularly directed mounting stem, a cap section for each seat cooperating therewith to anchor plural cable armors therein, and means on the adjacent inner ends of the cap sections for directing the cables into the throat.

5. A fitting for anchoring plural armored cables in an outlet box, comprising a base having plural armor receiving seats leading to a throat in an angularly directed mounting stem, the base being formed adjacent the throat with a notch in the side wall between the seats, cap means overlying the base to clamp the cable armors in the seats and having a part engaged in the notch to position the cap means on the base, and means for securing the cap means operative.

6. A fitting for anchoring plural armored cables in an outlet box, comprising a base having a tubular mounting stem and a plurality of laterally extending armor-receiving seats of substantially trough shape, and a cap mounted on the seats for anchoring the cable armors therein, the base and the cap having overlying portions at one side of each seat, one portion having a recess and the companion portion having a hook lockingly engaged in the recess, and means at the opposite side of each seat for securing such interlock between the hook and the recess, the cap extending across the throat of the tubular stem to cover the cables extending from the seats down through the throat.

7. A fitting for anchoring plural armored cables in an outlet box, comprising a base having a tubular mounting stem and a plurality of laterally extending armor-receiving seats of substantially trough shape, and a cap mounted on the seats for anchoring the cable armors therein, the base and the cap having overlying portions at one side of each seat, one portion having a recess and the companion portion having a hook lockingly engaged in the recess, and means at the opposite side of each seat for securing such interlock between the hook and the recess, the cap extending across the throat of the tubular stem to cover the cables extending from the seats down through the throat, the side walls of the trough-like seats being formed with notches intermediate the hooks, and the cap having a transverse rib fitting within the notches.

JAMES MERRELL.